Dec. 4, 1923.
C. ELLIS
1,476,330
PROCESS OF ADDING HYDROGEN
Filed July 29, 1919
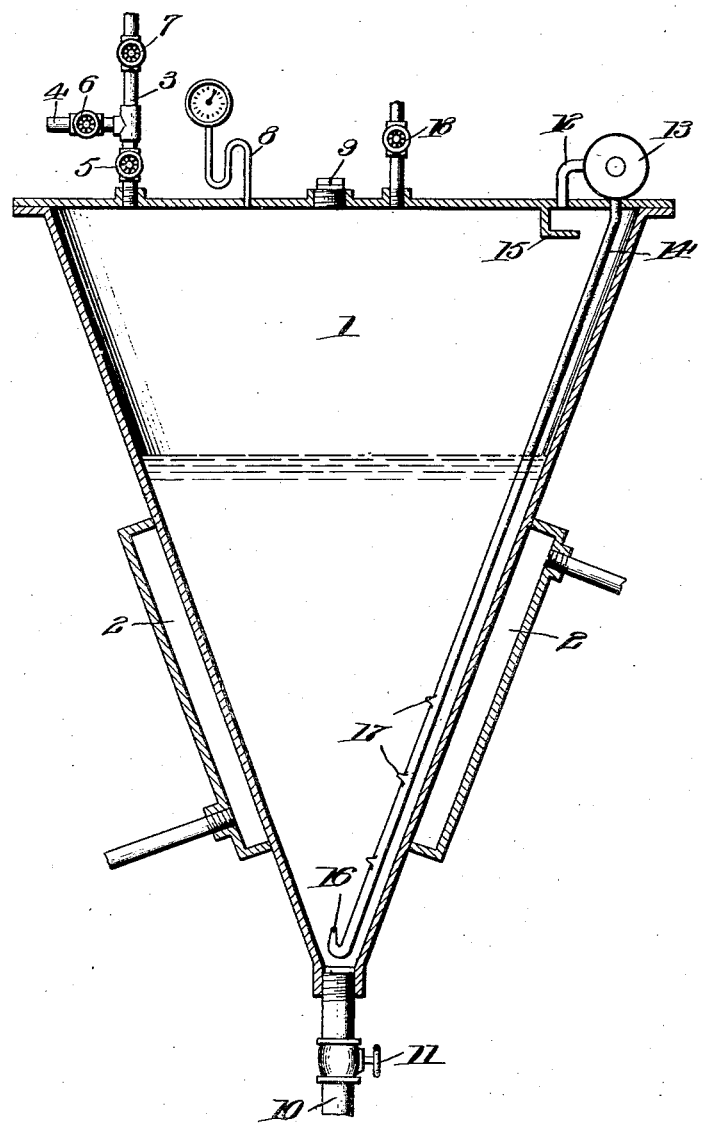
Witnesses
Inventor Patented Dec. 4, 1923.

1,476,330

UNITED STATES PATENT OFFICE.

CARLETON ELLIS, OF MONTCLAIR, NEW JERSEY.

PROCESS OF ADDING HYDROGEN.

Application filed July 29, 1919. Serial No. 314,121.

*To all whom it may concern:*

Be it known that I, CARLETON ELLIS, a citizen of the United States, and a resident of Montclair, in the county of Essex and State of New Jersey, have invented certain new and useful Improvements in Processes of Adding Hydrogen, of which the following is a specification.

This invention relates to a process of treating oily material and the like carrying unsaturated bodies, with hydrogen, to add hydrogen to a greater or less extent and thereby form additional saturated bodies. The invention comprises the steps of blowing hydrogen, preferably as a plurality of jets through a body of oil, preferably without any mechanical agitation, in the presence of nickel catalyzer in the form of discrete particles preferably also in the presence of finely divided inert material serving as a filtering medium.

The invention may be expressed in various forms or modifications and one form comprises repeatedly or continuously bubbling a current or body of hydrogen or gaseous mixtures containing essentially hydrogen, preferably under substantially atmospheric pressure, through a body of said material under suitable thermal conditions, in the presence of a catalyzer preferably of a finely-divided metallic nature, such as metallic nickel, or a metallic salt; and preferably in adding to the current or body of hydrogen, regularly, (continuously), gradually or in any other predetermined manner, a quantity of hydrogen substantially equal in amount to the then absorbed portion of hydrogen; all as more fully hereinafter described and as claimed. In one modification of the invention the process includes the circulation of the gas repeatedly and cyclically through a concrete body of oil without mechanical agitation of said body of oil, and without converting the oil into a spray, fog or mist, and preferably while maintaining the hydrogen gas, or gas containing hydrogen at or below atmospheric pressure. By the avoidance of superatmospheric pressure, (and to a certain extent also, by the avoidance of the mechanical agitation) not only are considerable mechanical difficulties avoided, but also, especially due to the low pressures used, the hydrogenation takes place without the reduction (to any material extent) of the carboxyl groups, and without the production (to any material extent) of various other undesirable side reactions which are produced when using hydrogen (or gases containing hydrogen) under high pressures. The pressure in the hydrogenation vessel is preferably maintained, during the process, at or preferably somewhat below atmospheric.

Various grades of oil and the like may thus be treated including different grades of mineral oil, essential oils and especially fatty esters having iodine numbers ranging from 75 to 130. Esters of this degree of unsaturation are especially well treated by the process. Fatty acids also may be treated. Oil such as corn, peanut and cottonseed oil, soya bean oil, almond oil, castor oil, fish oil and various greases may be hydrogenated to advantage in this manner. In producing oils for certain edible purposes it is desirable not to change the structure of the fat other than that produced by the addition of hydrogen. If decomposition is brought about by forced hydrogenation at high temperatures resulting in the destruction of the carboxyl group etc., certain forms of unsaponifiable matter may be produced the presence of which in edible fats may be open to criticism. In the present invention therefore especially for the purpose of making edible products the operation is carried out by careful regulation of conditions to eliminate or minimize the formation of unsaponifiable matter of an objectionable character.

Catalyzers useful in the present invention are of various types, but preferably finely divided metallic bodies, the particles of which are free from or not attached to gritty or pulverulent material are used; and if any material of the latter character is required for filtering purposes such material may be added at any suitable stage of the hydrogenation process, but preferably after hydrogenation has been completed and the operation of filtration to remove the catalyzer is in order. Metals such as nickel, platinum and palladium are useful and may if desired be employed in conjunction with finely divided carbon. Mixed nickel and cobalt catalyzers also may be used. It is preferable, in carrying out the process of the present application in one or more of its modifications, to employ a catalyzer comprising a metal approaching a non-settling state of fineness, which catalyst may be produced, for example, by the decomposition of nickel carbonyl or nickel salts of weak fatty acids, (such as nickel oleate) or similar compounds of other catalytically acting metals, such decomposition being effected and producing the metal in an extremely finely divided state, which metal suspends readily in the oil. Nickel formate and acetate likewise may be employed as a basis of catalytic nickel.

As stated, the addition of an inert material or bulking medium may be required in some cases for filtration purposes. This is especially true with nickel of a colloidal character such as that which may be produced by the decomposition of nickel carbonyl. A suitable inert material is fine pumice. This may be added to the nickel and the mixture introduced into the oil or the catalyzer and inert material may be added to the oil separately at any desired interval of the hydrogenation process. For example hydrogenation may be carried on for a time solely with a finely divided metallic catalyst and after a time the pumice or other extending or abraiding material may be added and the operation of introducing hydrogen continued to the desired extent. While the presence of extending material such as pumice mechanically admixed with the catalyzer and oil but not having the catalytic nickel supported on its surface may have a tendency to retard the action of hydrogenation, it assists to a considerable extent in removing the finer particles of nickel when the oil is passed through filter presses after the hardening treatment. It is not unlikely also that any retarding effect on hydrogenation brought about by the presence of inert material of this character may be advantageous in hydrogenating oils which absorb hydrogen with great rapidity and which might otherwise locally overheat.

I prefer to use a very sensitive catalyzer and variable but preferably relatively low pressure of hydrogen, preferably slightly under or about atmospheric pressure. Under these readily controllable or regulable conditions, apparently, the catalyzer maintains its activity for a longer period, and undesirable side reactions such as the reduction of the carboxyl group, etc., are less likely to take place, in many instances. Thus the oil is subjected to a gas pressure variable according to circumstances, but substantially so low as to avoid undesirable side reactions and to protract the life of the catalyzers. A desirable method of operation is to employ hydrogen under just sufficient pressure to force its way through the oil and by means of an exhaust pump connected with the receptacle at the top to pump away the excess or unused hydrogen so rapidly that a slight vacuum, say 1 or 2 pounds below atmospheric pressure is maintained. Thus the oil is hydrogenated under reduced or sub-atmospheric pressure. In other modifications of the invention pressures above the oil equal to atmospheric or greater may be employed.

The carboxyl group COO commonly expressed as COOH (or COOR as it appears in glycerides such as mentioned in the foregoing) or other oxygenated group sometimes show a tendency to become reduced under forced hydrogenation and the water formed, of course quickly acts upon many of the more sensitive catalyzers to depress their activity. Regulation of the pressure in a predetermined manner so as to substantially prevent the reduction of the carboxyl group falls within the purview of the present invention.

The temperature of hydrogenation is adjusted with reference to the oil to be treated and the catalyzer employed. Nickel catalyzers may often permit of a temperature of 150° C. to 200° C. while the platinum and palladium catalyzers are usually better handled at a temperature of from 90° C. to 110° C.

While the introduction of hydrogen may be by means of a single jet directed upwardly through the body of the oil, a plurality of jets may be used as stated and these may be directed in various directions in the body of oil for example in some cases tangentially, for example when hydrogenation first starts the reaction may go on quite vigorously with development of heat and very complete absorption of hydrogen so that but little hydrogen passes out in the form of bubbles at the surface of the oil. Of course the amount which bubbles out of the oil depends upon the amount of hydrogen introduced at the bottom of the body of oil, the nature of the oil and activity of the catalyzer. Steam and other impurities may be given off and contaminate the hydrogen so that the first portions may be discarded if desired or may be conducted to some point for purification. In a preferred form of the invention the hydrogen gas which passes through the body of oil without absorption and which may be termed the excess gas is pumped away from the surface of the liquid and returned again to the bottom of the body of oil. The cyclic travel of hydrogen in this manner constitutes one preferred feature of the present invention but the latter is not limited thereto, it being possible to introduce hydrogen in other ways depending upon the particular phase or modification of the invention which is being operated.

The accompanying drawing shows apparatus suitable for carrying out the process of the present invention. The drawing represents in a diagrammatic way a vertical section of a cone-shaped treating receptacle, having suitable inlets and outlets, and a superposed pump for circulating and bubbling the hydrogen gas.

In the drawing 1 is a conical tank having the heating jacket 2, oil supply pipe 3 and hydrogen supply pipe 4. These pipes carry the valves 5, 6 and 7. A vacuum or pressure gauge is shown at 8. 9 is an inlet fitted with a removable plug. 10 is an oil outlet pipe carrying the valve 11. 12 is a gas-intake pipe extending through the top of the tank 1 and communicating with the rotary pump 13. From the pump a delivery or discharge pipe 14 extends to the bottom of the tank and terminates in the upturned jet or nozzle 16. Additional jets or nozzles for admitting hydrogen into the oil are shown at 17. These project laterally and approximately tangentially from the pipe 14. 18 is a valve in the gas exhaust pipe and in case a pressure below atmospheric is to be maintained in the hydrogenating vessel, this pipe may be connected to a suitable suction device. Obviously air should not be admitted to the hydrogenation receptacle during the time of treating the oil with hydrogen.

The operation of the process in its present illustrative embodiment is as follows:—
Valves 5 and 7 in pipe 3 are opened and the tank 1 is charged with oil two-thirds full or so. Heat is applied to the charge by means of the heating jacket 2, and when the requisite temperature is reached, the valve 7 is closed and the valves 6 and 18 opened and hydrogen gas passed in for a short time to displace any air that may be present in the tank. Catalyzer is then introduced (for example through 9), the pump 13 put into operation and the valves 6 and 18 adjusted to permit any desired influx and outflow of the gas. The body of gas in the upper part of tank 1 is maintained at a pressure below that at which, under the other conditions of operation, substantially little or no reducing action on the carboxyl group of the glycerides, etc., under treatment takes place, and while a portion of this gas may be withdrawn through the valve 18 a substantial portion of such gas is impelled by the pump 13 well beneath the surface of the body of oil. The lower upturning nozzle produces an upward jet of gas and the side nozzles yield lateral streams. This introduction of hydrogen, below the surface (partly in an upward direction, and partly in a substantially horizontal tangential direction) assures an effective distribution of the gas. The catalyzer is thus moved rapidly about within the body of oil in contact with hydrogen more or less, and absorption of hydrogen by the heated oil takes place. When hydrogenated to the desired extent, the oil and catalyzer is run off through the pipe 10, and the oil suitably separated from said catalyzer.

It will be observed that the control of the pressure existing in the hydrogenation vessel is secured by coaction of several factors, to-wit:—

(a) The speed of the pump 13, (since the absorption of hydrogen by the oil reduces the pressure in the vessel).

(b) The rate at which hydrogen gas is introduced into the vessel, through pipe 4 (degree to which valve 6 is opened).

(c) The rate at which gas is taken out of the apparatus, through the pipe containing the valve 18 (degree to which valve 18 is open).

It is obvious that these three factors will be so controlled as to maintain the desired amount of reduction of pressure (desired vacuum as shown by the gauge 8) in the hydrogenation vessel.

While, as stated, the process may be carried out at various pressures, it is desirable to avoid superatmospheric pressure in the body of gas bathing the oil, as may be readily secured by adjusting the speed of the pump with reference to the area of cross section of the inlet and outlet pipes, 12 and 14, respectively in connection with the proper adjustment of the other valves in the device.

The following illustrates one manner of carrying out my invention. Ordinary lubricating oil from petroleum having unsaturated components represented by an iodine number of about 15 and which, because of this degree of unsaturation, has gumming qualities or a tendency to carbonize readily when used as an engine lubricant and exposed to high temperatures, has added thereto one-half of one per cent of powdered nickel and is heated to 200° C. with introduction of hydrogen as a cyclic current. After the iodine number has fallen to nearly zero, three per cent of fuller's earth is introduced and the mixture pumped through a filter press to yield a clear oil. The filter cake consisting of a mixture of powdered nickel and fuller's earth is collected and used for hydrogenating other oils or additional fresh quantities of the same oil.

According to another example 15000 pounds of cottonseed oil having an iodine number of about 106 is heated to 150° C. in a closed receptacle. 40 pounds of nickel powder and 200 pounds of fine pumice are added. Hydrogen is forced in through a number of jets, under a pressure of several pounds, sufficient to force the gas through the column of oil. The exit gases are pumped away from the top of the receptacle and after the first stages of hydrogenation the gases are sufficiently pure to be continuously returned to the oil. Heat is evolved and a temperature of 180° is soon reached when water may be passed through the jacket to maintain the temperature below the point at which the oil discolors. This is usually not much over 200°. The circulation of the gas is kept up for a period of six hours, hydrogen being added from time to time to replenish that which has been absorbed by the oil. The oil is filtered and the resultant product has a melting point of about 60° C. In another case the operation is carried out in the same manner but the pumice is omitted during hydrogenation, 250 pounds of silex or 150 pounds of kieselguhr being added at the completion of the hydrogenation prior to passage of the oil into the filter presses.

The present application covers matter disclosed in my application Serial No. 695,206, filed May 4th, 1912, and application Serial No. 716,942, filed August 24, 1912, a portion of the said subject matter of the present case being disclosed in my copending applications Nos. 808,461, filed December 23, 1913, (now Patent No. 1,426,629), and my application No. 264,005, filed November 25th, 1918.

What I claim is:—

1. The process of hydrogenating oils which comprises adding to a fatty oil having an iodine number between 75 and 130, a small quantity of finely divided nickel-containing catalyst and also introducing a small quantity of powdered inert extending material, such nickel containig catalyst being of a degree of fineness capable of being readily held in suspension in the oil by bubbling hydrogen-containing gas therethrough and being free from rigid physical attachment to said inert extending material, maintaining the oil at a temperature of between approximately 150 and 200° C., while passing a current of hydrogen through the oil.

2. The process of hydrogenating oils which comprises adding to a fatty oil having an iodine number between 75 and 130, a small quantity of finely divided nickel-containing catalyst and also introducing a small quantity of powdered inert extending material, such nickel-containing catalyst being of a degree of fineness capable of being readily held in suspension in the oil by bubbling hydrogen-containing gas therethrough and being free from rigid physical attachment to said inert extending material, maintaining the oil at a temperature of between approximately 150 and 200° C., while passing a cyclic current of hydrogen through the oil, and maintaining in the treating receptacle, a gas pressure not materially above atmospheric.

3. The process of hydrogenating oils which comprises adding to a fatty oil having an iodine number between 75 and 130, a small quantity of finely divided nickel-containing catalyst and also introducing a small quantity of powdered inert extending material, such nickel-containing catalyst being of a degree of fineness capable of being readily held in suspension in the oil by bubbling hydrogen-containing gas therethrough and being free from rigid physical attachment to said inert extending material, maintaining the oil at a temperature of between 150 and 200° C., while passing a current of hydrogen through the oil, while avoiding mechanical stirring of the oil under reatment.

4. A process which comprises forming a mixture of oil and a ready-formed nickel-containing catalyst which latter is in a sufficiently finely divided state to be readily maintained in suspension in the oil by bubbling a hydrogen-containing gas through such oil, such catalyst being free from attachment to an earthy carrier, introducing hydrogen-containing gas at the lower part of the body of oil as the sole agitating means, and continuing the action until the hydrogenation operation is well advanced, and adding a bulking agent capable of serving as a filtration-aid, and thereafter filtering to separate the bulking agent and catalyst from the treated oil.

5. The process of treating oily material carrying unsaturated bodies which comprises injecting a current of hydrogen in a substantially vertical direction into a body of supernatant oily material carrying a freely-movable catalyzer, and in simultaneously injecting thereinto an eddy-destroying laterally directed tangential current of hydrogen, in collecting the unabsorbed gas, in repeatedly impelling same through said material, and in supplying additional quantities of hydrogen to substantially replace the absorbed portion; said body of oily material being maintained in concrete form during the period of hydrogen absorption and being subjected to a hydrogen pressure approximately atmospheric.

6. The process of treating oily material carrying unsaturated bodies which comprises injecting streams of a hydrogen-containing gas substantially vertically into a body of supernatant oily material carrying a freely-movable catalyzer, in injecting other streams of a hydrogen-containing gas in a substantially lateral and tangential direction; whereby the formation of useless eddy currents is minimized; in collecting the unabsorbed gas, in repeatedly impelling same through said material, and in supplying additional quantities of hydrogen to substantially replace the absorbed portion; said body of oily material being maintained in concrete form during the period of hydrogen absorption and being subjected to a hydrogen pressure approximately atmospheric.

CARLETON ELLIS.